United States Patent
Clark et al.

(10) Patent No.: US 11,365,644 B2
(45) Date of Patent: Jun. 21, 2022

(54) DOUBLE BOX BOAS AND CARRIER SYSTEM

(71) Applicant: Raytheon Technologies Corporation, Farmington, CT (US)

(72) Inventors: Thomas E. Clark, Sanford, ME (US); William M. Barker, North Andover, MA (US); Daniel J. Whitney, Topsham, ME (US); Danielle Mahoney, Dover, NH (US); William Wangard, III, Stratham, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 95 days.

(21) Appl. No.: 16/917,048

(22) Filed: Jun. 30, 2020

(65) Prior Publication Data
US 2021/0003026 A1 Jan. 7, 2021

Related U.S. Application Data (60) Provisional application No. 62/869,090, filed on Jul. 1, 2019.

(51) Int. Cl.
*F01D 11/08* (2006.01)
*F01D 25/24* (2006.01)

(52) U.S. Cl.
CPC ............ *F01D 11/08* (2013.01); *F01D 25/246* (2013.01); *F05D 2240/11* (2013.01); *F05D 2240/14* (2013.01)

(58) Field of Classification Search
CPC ...... F01D 11/08; F01D 25/246; F01D 11/005; F05D 2240/11; F05D 2240/14
See application file for complete search history.

(56) References Cited

U.S. PATENT DOCUMENTS 5,088,888 A 2/1992 Bobo
7,563,071 B2* 7/2009 Campbell ................ F01D 9/04
                                                    415/173.1

(Continued)

FOREIGN PATENT DOCUMENTS

EP 2631434 8/2013
EP 3093455 11/2016

(Continued)

OTHER PUBLICATIONS

Extended EP Search Report for EP Application No. 20183519.6 dated Sep. 14, 2020.

*Primary Examiner* — Eldon T Brockman
(74) *Attorney, Agent, or Firm* — Carlson, Gaskey & Olds, P.C.

(57) ABSTRACT

A blade outer air seal assembly includes a support structure. A blade outer air seal has a plurality of seal segments that extend circumferentially about an axis and mounted in the support structure via a carrier. The carrier has a plurality of carrier segments that extend circumferentially about the axis. At least one of the seal segments have a base portion that extends between a first circumferential side and a second circumferential side and from a first axial side to a second axial side. A first wall axially spaced from a second wall. The first and second walls extend from the base portion to a first outer portion to form a first passage. The first wall has at least one slot engaged with a first carrier hook on one of the plurality of carrier segments. At least one of the carrier segments have a carrier window engaged with a support structure hook on the support structure.

18 Claims, 5 Drawing Sheets

(56) References Cited

U.S. PATENT DOCUMENTS

| | | | |
|---|---|---|---|
| 8,585,354 B1 | 11/2013 | Liang | |
| 9,828,879 B2* | 11/2017 | Sluyter | F01D 25/246 |
| 10,458,268 B2* | 10/2019 | O'Leary | F01D 11/08 |
| 11,035,243 B2* | 6/2021 | Clark | F01D 11/005 |
| 2007/0031258 A1* | 2/2007 | Campbell | F01D 9/04 |
| | | | 416/189 |
| 2016/0319686 A1 | 11/2016 | Shi et al. | |
| 2017/0298753 A1* | 10/2017 | O'Leary | F01D 9/02 |
| 2017/0356308 A1* | 12/2017 | Rammohan | B22F 5/009 |
| 2019/0368366 A1* | 12/2019 | Clark | F01D 11/08 |

FOREIGN PATENT DOCUMENTS

| | | |
|---|---|---|
| EP | 3115559 | 1/2017 |
| EP | 3257609 | 12/2017 |

\* cited by examiner

DOUBLE BOX BOAS AND CARRIER SYSTEM

CROSS-REFERENCE TO RELATED APPLICATIONS

This application claims priority to U.S. Provisional Application No. 62/869,090, which was filed on Jul. 1, 2019 and is incorporated herein by reference.

BACKGROUND

This application relates to a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a blade outer air seal assembly includes a support structure. A blade outer air seal has a plurality of seal segments that extend circumferentially about an axis and mounted in the support structure via a carrier. The carrier has a plurality of carrier segments that extend circumferentially about the axis. At least one of the seal segments have a base portion that extends between a first circumferential side and a second circumferential side and from a first axial side to a second axial side. A first wall axially spaced from a second wall. The first and second walls extend from the base portion to a first outer portion to form a first passage. The first wall has at least one slot engaged with a first carrier hook on one of the plurality of carrier segments. At least one of the carrier segments have a carrier window engaged with a support structure hook on the support structure.

In a further embodiment of the above, the first carrier hook extends into the first passage.

In a further embodiment of any of the above, the first carrier hook extends axially aft.

In a further embodiment of any of the above, the at least one seal segment has a third wall and a fourth wall. The third and fourth walls are joined by a second outer wall to form a second passage.

In a further embodiment of any of the above, a second carrier hook is engaged with a second slot in the third wall.

In a further embodiment of any of the above, the first carrier hook extends into the first passage and the second carrier hook extends into the second passage.

In a further embodiment of any of the above, the carrier window has a generally rectangular portion with notched corners.

In a further embodiment of any of the above, a second carrier window is spaced circumferentially from the carrier window.

In a further embodiment of any of the above, the carrier window and the second carrier window have the same shape.

In a further embodiment of any of the above, a circumferential width of the at least one slot is about 30% to 50% of a circumferential width of the at least one seal segment.

In a further embodiment of any of the above, a wedge seal is arranged between at least two of the seal segments.

In a further embodiment of any of the above, the base portion has a slanted portion at the first and second circumferential sides. The slanted portion configured to abut the wedge seal.

In a further embodiment of any of the above, the at least one carrier segment is a metallic material.

In a further embodiment of any of the above, the at least one blade outer air seal is a ceramic matrix composite material.

In another exemplary embodiment, a gas turbine engine includes a compressor section, a combustor section, and a turbine section arranged about an axis of rotation. The turbine section has a row of blades aft of a row of vanes. A blade outer air seal assembly has a plurality of segments arranged radially outward of the row of blades and extend circumferentially about an axis. The plurality of segments are mounted in a support structure via a carrier. The carrier has a plurality of carrier segments that extend circumferentially about the axis. At least one of the seal segments has a base portion that extends between a first circumferential side and a second circumferential side and from a first axial side to a second axial side. A first wall is axially spaced from a second wall. The first and second walls extend from the base portion to a first outer portion to form a first passage. The first wall has at least one slot engaged with a first carrier hook on one of the plurality of carrier segments. At least one of the carrier segments has a carrier window engaged with a support structure hook on the support structure.

In a further embodiment of any of the above, the carrier supports a portion of the vane.

In a further embodiment of any of the above, the at least one seal segment has a third wall and a fourth wall. The third and fourth walls are joined by a second outer wall to form a second passage. The first carrier hook extends into the first passage. A second carrier hook extends into the second passage.

In a further embodiment of any of the above, the at least one seal segment is a ceramic matrix composite material.

In another exemplary embodiment, a method of assembling a blade outer air seal assembly includes mounting a carrier segment to a support structure by inserting a support structure hook into a window on the carrier segment. The carrier segment is slid axially aft with respect to the support structure such that the support structure hook contacts a surface of the carrier segment. A blade outer air seal segment having a first passage and a second passage is mounted onto the carrier segment by inserting a first carrier hook into the first passage and a second carrier hook into the second passage.

In a further embodiment of any of the above, the blade outer air seal segment is a ceramic matrix composite material and the carrier segment is a metallic material.

DETAILED DESCRIPTION

Figure 1:
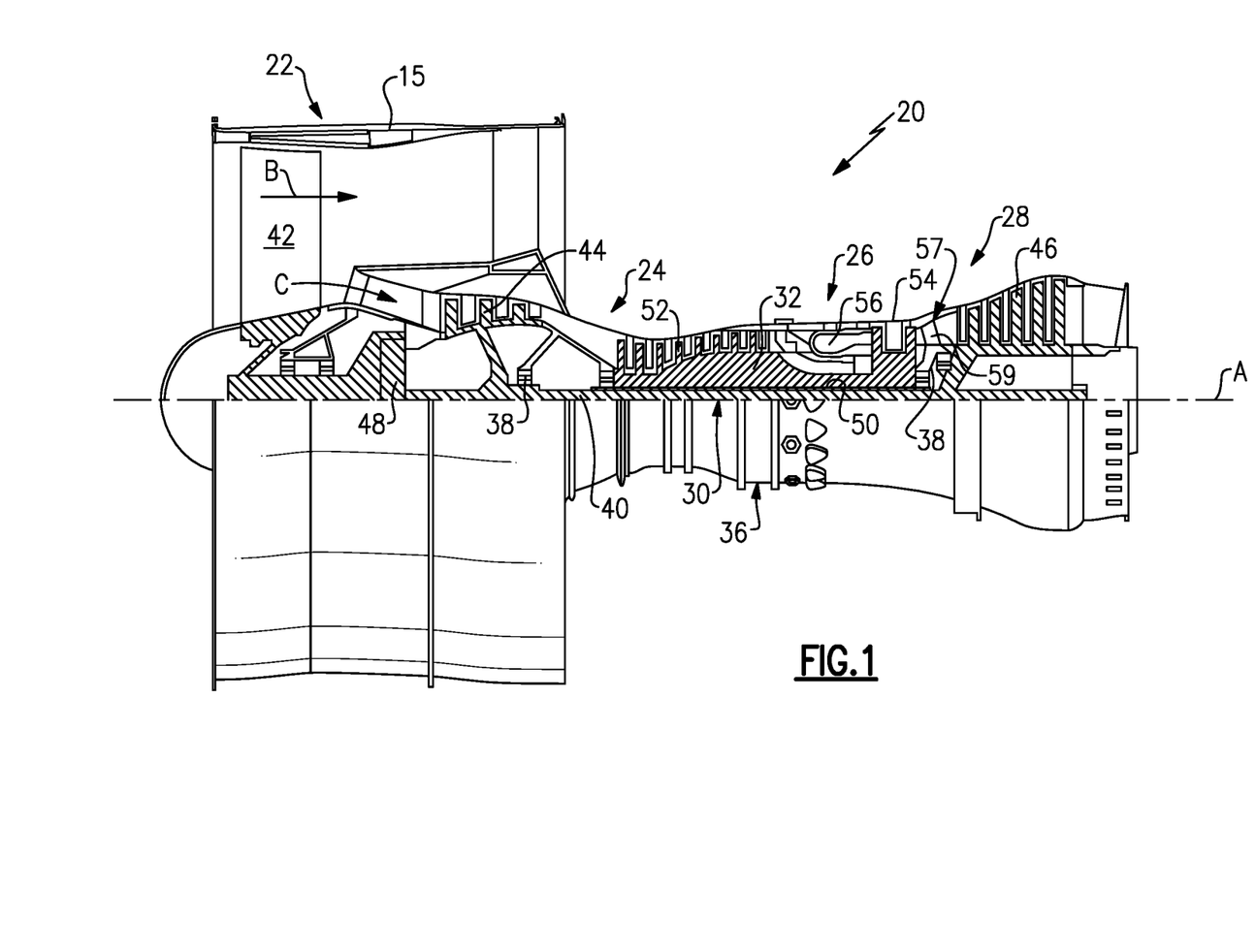
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
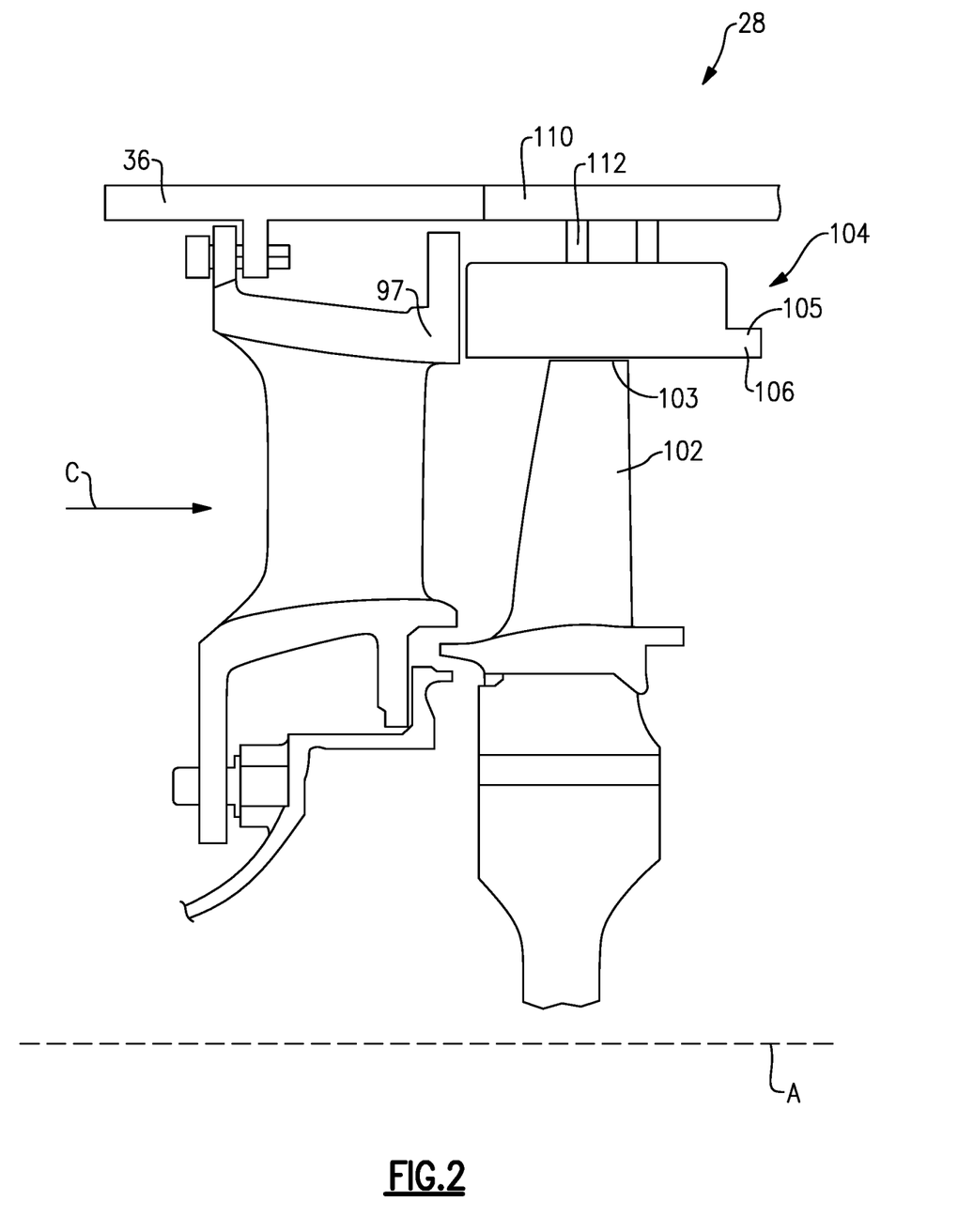
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
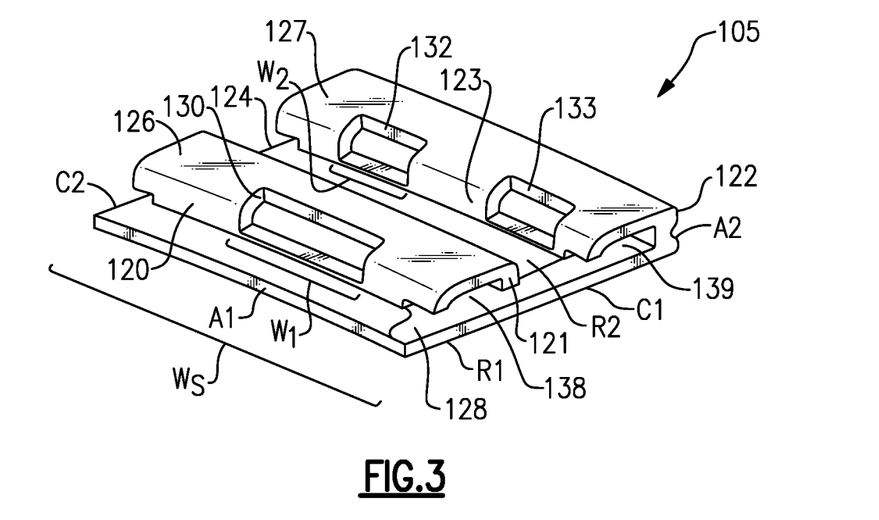
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

This BOAS segment 105 example has a "double box" arrangement. The BOAS segment 105 includes a first wall 120 and a second wall 121 that extend radially outward from a base portion 124. The first and second walls 120, 121 are spaced from one another in the axial direction. The first and second walls 120, 121 are joined by a first outer wall 126 to form a first passage 138. The first passage 138 extends generally circumferentially across the base portion 124. A third wall 123 and a fourth wall 122 extend radially outward from the base portion 124. The third and fourth walls 123, 122 are spaced from one another in the axial direction. The third and fourth walls 123, 122 are joined by a second outer portion 127 to form a second passage 139. The second passage 139 extends generally circumferentially across the base portion 124. The first and second passages 138, 139 are generally parallel to one another.

The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the walls 120, 121, 122, 123 to provide a surface for sealing of the BOAS first and second axial sides A1, A2.

A first slot 130 is formed in the first wall 120 and the first outer wall 126. Second and third slots 132, 133 are formed in the third wall 123 and second outer wall 127. The slots 130, 132, 133 provide access to the passages 138, 139 for securing the BOAS segment 105 to the carrier 112 and/or support structure 110. Although in this example, a single slot 130 is formed on the first outer wall 126 while two slots 132, 133 are formed on the second outer wall 127, more or fewer slots may be formed on each of the outer walls 126, 127. The slots 130, 132, 133 may be formed on a forward portion of the outer wall 126, 127. In one example, the BOAS segment 105 has a width $W_S$ in the circumferential direction. The first slot 130 has a width $W_1$ in the circumferential direction. The width $W_1$ is between about 30% and 50% of the width $W_S$, in some examples. In a further example, the width $W_1$ is about 40% of the width $W_S$. The second slot 132 has a width W2. The second and third slots 132, 133 may have about the same width. The second slot width W2 may be about half of the first slot width $W_1$, such that the second and third slots 132, 133 combined have about the same width as the first slot 130.

The base portion 124 near the first and second circumferential sides C1, C2 may have a slanted portion 128. The slanted portion 128 slants radially inward towards the circumferential sides C1, C2. The slanted portion 128 may mate with an intersegment seal between adjacent BOAS segments 105.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The double box arrangement may be formed with CMC laminates by forming two individual box sections about a mandrel, then wrapping braid about the two box sections. The component may be further densified by adding additional material to coat the laminates. Features of the BOAS segment 105, such as slots 130, 132, 133 may then be machined into the component.

Figure 4:
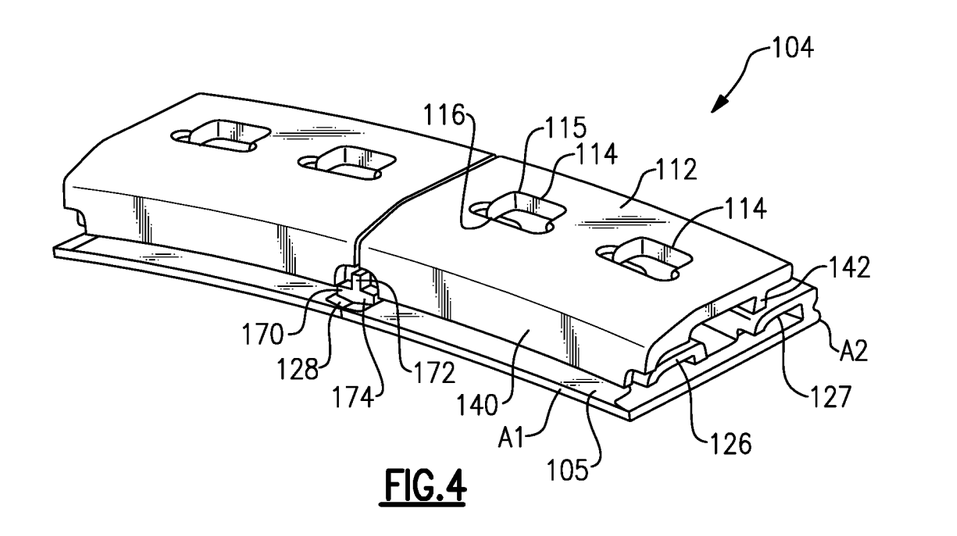
FIG. 4 illustrates a portion of an exemplary blade outer air seal assembly.

FIG. 4 illustrates a portion of the BOAS assembly 104. A carrier 112 is engaged with the seal segments 105. The carrier may be a metallic material, such as a nickel or cobalt based alloy, for example. In an example, the carrier 112 is segmented. In some examples, the number of carrier segments 112 is the same as the number of BOAS segments 105. The carrier 112 includes a first wall 140 and a second wall 142 extending radially inward for engagement with the BOAS segment 105. The carrier 112 includes a window 114 for engagement with the support structure 110. In the illustrated example, the carrier 112 includes two windows 114. In other examples, more or fewer windows may be used. Each window 114 may have a "bread loaf" shape. That is, the window 114 has a generally rectangular portion 115 and an oblong portion 116, or the window 114 has a generally rectangular portion 115 with notched out corners 116. This shape may extend axial clearance and accommodate machining features in the manufacturing process.

In some examples, a wedge seal 170 is arranged between adjacent seal segments 105. The wedge seal 170 generally includes a circumferentially extending portion 174 and a radially extending portion 172. The wedge seal 170 extends axially along most of the length of the BOAS segment 105. The wedge seal 170 is engaged with the slanted portion 128. The wedge seal 170 may be a ceramic or metallic material, for example. The wedge seal 170 is slid into place axially.

Figure 5:
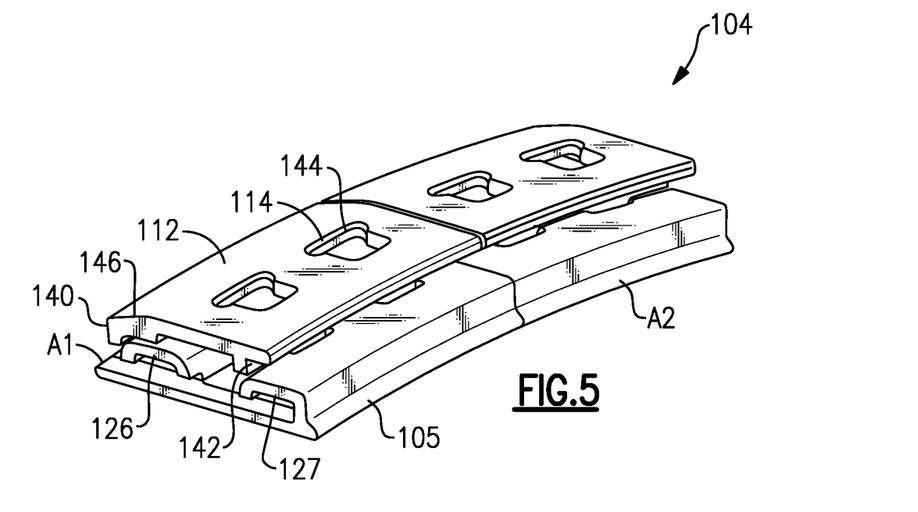
FIG. 5 illustrates a portion of the exemplary blade outer air seal assembly.

FIG. 5 illustrates a portion of the BOAS assembly 104. In some examples, the oblong portion 116 of the window 114 may include a chamfer 144. The chamfer 144 may provide extra clearance for assembly of the carrier 112 and the support structure 110. The carrier 112 may include a slanted portion 146 at an axially forward portion. The slanted portion 146 helps the carrier 112 to fit into the support structure 110.

Figure 6:
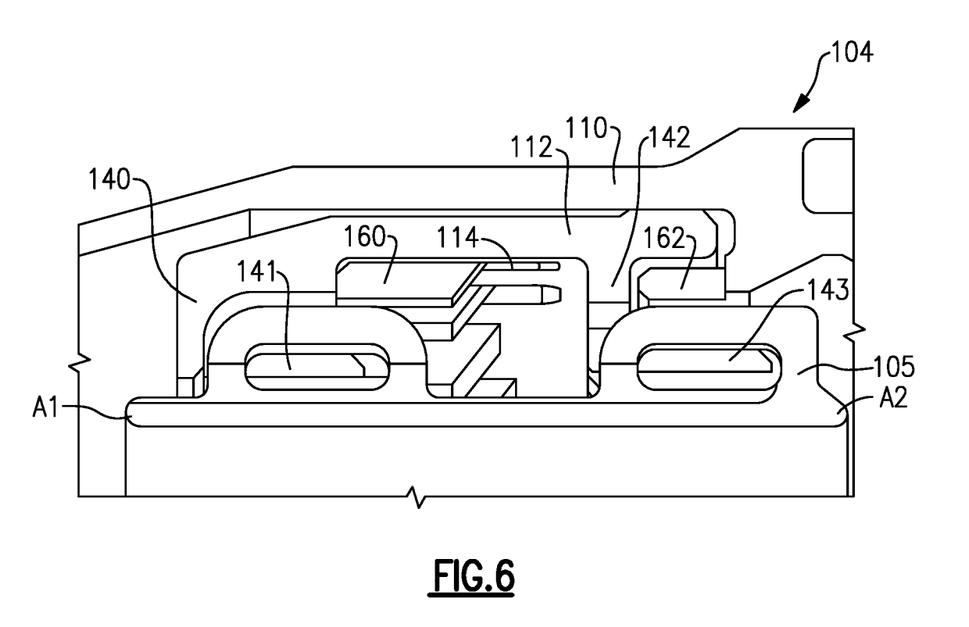
FIG. 6 illustrates an example cross sectional view of a portion of the exemplary blade outer air seal assembly.

FIG. 6 illustrates a side view of a portion of the BOAS assembly 104. The first wall 140 on the carrier 112 has a first hook 141 that extends through the first slot 130 and into the first passage 138 of the seal segment 105. The second wall 142 of the carrier 112 has a pair of second hooks 143 that extend through the second and third slots 132, 133 and into the second passage 139 of the seal segment 105. The carrier hooks 141, 143 and BOAS segment slots 130, 132, 133 provide stable three point contact between the carrier 112 and the BOAS segment 105.

The support structure 110 has a forward hook 160 and an aft hook 162 for engagement with the carrier 112. The forward hooks 160 extend through the windows 114 on the carrier 112. The second wall 142 of the carrier 112 and the second hook 143 form a carrier channel for receiving the aft hook 162 of the support structure 110. In some examples, a brush seal may be arranged along the first axial side A1 to pressurize the BOAS cavities and retain the BOAS axially.

In some examples, a split ring seal may be used to help maintain the BOAS segments 105 radially and axially.

Figure 7:
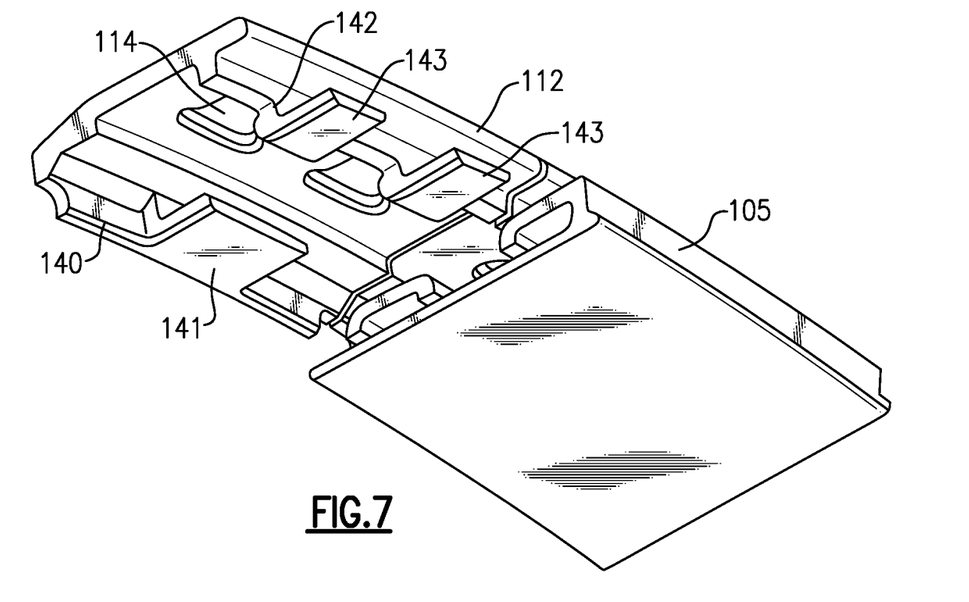
FIG. 7 illustrates a portion of the exemplary blade outer air seal assembly.

FIG. 7 illustrates a portion of the BOAS assembly 104. The carrier hooks 141, 143 extend generally axially. In this example, the carrier hooks 141, 143 extend aft, but in other examples, the carrier hooks 141, 143 may extend forward. The carrier hooks 141, 143 are circumferentially positioned to mate with the slots 130, 132, 133 on the BOAS segment 105.

Figure 8:
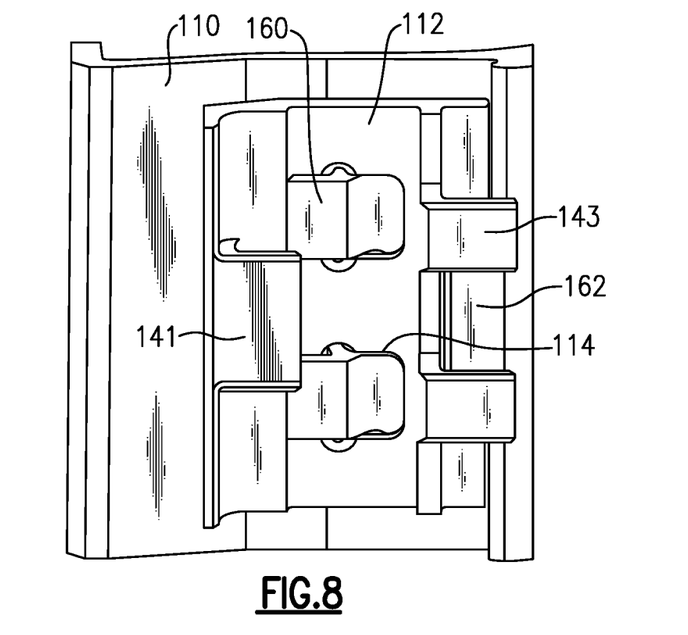
FIG. 8 illustrates a portion of the exemplary blade outer air seal assembly.

FIG. 8 illustrates a portion of the BOAS assembly 104. The support structure hooks 160, 162 extend generally axially. In this example, the support structure hooks 160, 162 extend forward for engagement with the carrier 112. The BOAS assembly 104 is assembled by sliding the carrier radially toward the support structure 110 such that the hooks 160 on the support structure 110 slide into the windows 114 on the carrier 112. The carrier 112 is then slid axially aft such that the hooks 160 and hooks 162 support the carrier 112 in the radial direction. The BOAS segment 105 is mounted by sliding radially outward, then axially forward onto the carrier 112.

Many known CMC mounting arrangements take up a lot of space in the radial direction. The disclosed BOAS arrangement provides a compact mounting arrangement. The disclosed arrangement also permits axial assembly, which permits removal of individual components in case the part is damages or worn. The disclosed arrangement further permits the carrier to take on mechanical load from forward vanes, which may reduce the load on the CMC BOAS segments.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a support structure;
   a blade outer air seal having a plurality of seal segments extending circumferentially about an axis and mounted in the support structure via a carrier, the carrier having a plurality of carrier segments extending circumferentially about the axis;
   at least one of the seal segments having a base portion extending between a first circumferential side and a second circumferential side and from a first axial side to a second axial side, a first wall axially spaced from a second wall, the first and second walls extending from the base portion to a first outer portion to form a first passage, the first wall having at least one slot engaged with a first carrier hook on one of the plurality of carrier segments; and
   at least one of the carrier segments having a carrier window engaged with a support structure hook on the support structure.

2. The blade outer air seal assembly of claim 1, wherein the first carrier hook extends into the first passage.

3. The blade outer air seal assembly of claim 1, wherein the first carrier hook extends axially aft.

4. The blade outer air seal assembly of claim 1, wherein the at least one seal segment has a third wall and a fourth wall, the third and fourth walls joined by a second outer wall to form a second passage.

5. The blade outer air seal assembly of claim 4, wherein a second carrier hook is engaged with a second slot in the third wall.

6. The blade outer air seal assembly of claim 5, wherein the first carrier hook extends into the first passage and the second carrier hook extends into the second passage.

7. The blade outer air seal assembly of claim 1, wherein the carrier window has a generally rectangular portion with notched corners.

8. The blade outer air seal assembly of claim 1, wherein a second carrier window is spaced circumferentially from the carrier window.

9. The blade outer air seal assembly of claim 8, wherein the carrier window and the second carrier window have the same shape.

10. The blade outer air seal assembly of claim 1, wherein a circumferential width of the at least one slot is about 30% to 50% of a circumferential width of the at least one seal segment.

11. The blade outer air seal assembly of claim 1, wherein a wedge seal is arranged between at least two of the seal segments.

12. The blade outer air seal assembly of claim 11, wherein the base portion has a slanted portion at the first and second circumferential sides, the slanted portion configured to abut the wedge seal.

13. The blade outer air seal assembly of claim 1, wherein the at least one carrier segment comprises a metallic material.

14. The blade outer air seal assembly of claim 1, wherein the blade outer air seal comprises a ceramic matrix composite material.

15. A gas turbine engine, comprising:
   a compressor section, a combustor section, and a turbine section arranged about an axis of rotation, the turbine section having a row of blades aft of a row of vanes;
   a blade outer air seal assembly having a plurality of seal segments arranged radially outward of the row of blades and extending circumferentially about an axis, the plurality of segments mounted in a support structure via a carrier, the carrier having a plurality of carrier segments extending circumferentially about the axis;
   at least one of the seal segments having a base portion extending between a first circumferential side and a second circumferential side and from a first axial side to a second axial side, a first wall axially spaced from a second wall, the first and second walls extending from the base portion to a first outer portion to form a first passage, the first wall having at least one slot engaged with a first carrier hook on one of the plurality of carrier segments; and
   at least one of the carrier segments having a carrier window engaged with a support structure hook on the support structure.

16. The gas turbine engine of claim 15, wherein the carrier supports a portion of a vane of the row of vanes.

17. The gas turbine engine of claim 15, wherein the at least one of the seal segments has a third wall and a fourth wall, the third and fourth walls joined by a second outer wall to form a second passage, the first carrier hook extends into the first passage and a second carrier hook extends into the second passage.

18. The gas turbine engine of claim 15, wherein the at least one of the seal segments comprises a ceramic matrix composite material.

\* \* \* \* \*